United States Patent
Shimizu et al.

(10) Patent No.: US 9,981,627 B2
(45) Date of Patent: May 29, 2018

(54) AIRBAG DEVICE

(71) Applicant: Autoliv Development AB, Vårgårda (SE)

(72) Inventors: Takayuki Shimizu, Yokohama (JP);
Nozomi Furusawa, Yokohama (JP);
Tadashi Kobata, Yokohama (JP);
Takahiro Ouchi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days. days.

(21) Appl. No.: 15/324,162

(22) PCT Filed: Apr. 14, 2015

(86) PCT No.: PCT/JP2015/061442
§ 371 (c)(1),
(2) Date: Jan. 5, 2017

(87) PCT Pub. No.: WO2016/006296
PCT Pub. Date: Jan. 14, 2016

(65) Prior Publication Data
US 2017/0158156 A1      Jun. 8, 2017

(30) Foreign Application Priority Data

Jul. 9, 2014   (JP) ................................ 2014-140993

(51) Int. Cl.
*B60R 21/217*      (2011.01)
*B60R 21/235*      (2006.01)
(52) U.S. Cl.
CPC ........ *B60R 21/217* (2013.01); *B60R 21/2171* (2013.01); *B60R 21/235* (2013.01)

(58) Field of Classification Search
CPC .. B60R 21/217; B60R 21/235; B60R 21/2171
See application file for complete search history.

(56) References Cited

U.S. PATENT DOCUMENTS

| 5,791,685 A | * | 8/1998 | Lachat | B60R 21/23138 |
| | | | | 280/729 |
| 6,578,866 B2 | * | 6/2003 | Higashi | B60R 21/207 |
| | | | | 280/728.2 |

(Continued)

FOREIGN PATENT DOCUMENTS

| CN | 1769102 A | 5/2006 |
| JP | 2006-76392 | 3/2006 |

(Continued)

OTHER PUBLICATIONS

PCT International Search Report—dated May 19, 2015.

*Primary Examiner* — Drew J Brown
(74) *Attorney, Agent, or Firm* — Brinks Gilson & Lione

(57) ABSTRACT

An airbag device configured such that, inflator gas is less likely to leak outside from an insertion hole formed on a cushion and into which the inflator is inserted during assembly of the airbag device. The airbag device 100 includes: a bag-shaped cushion 108 which deploys using gas supplied from inflator 110; an insertion hole 112 formed on the cushion and through which the inflator is inserted; and a covering part 120 provided on an inner side of the cushion and covers the insertion hole. The covering part includes: a first cloth piece 122 overlapping the insertion hole and on which a slit 126 that is elongated in one direction is formed; and a second cloth piece 124 positioned to overlap the first cloth piece and a slot 128 is formed having a longitudinal direction intersecting a longitudinal direction of the slit overlapping the insertion hole.

11 Claims, 8 Drawing Sheets

(56) References Cited

U.S. PATENT DOCUMENTS

| | | | |
|---|---|---|---|
| 7,226,077 B2 * | 6/2007 | Abe | B60R 21/206 |
| | | | 280/728.1 |
| 7,658,400 B2 * | 2/2010 | Wipasuramonton | |
| | | | B60R 21/2171 |
| | | | 280/728.2 |
| 8,047,570 B2 * | 11/2011 | Feller | B60R 21/239 |
| | | | 280/728.2 |
| 9,108,587 B2 * | 8/2015 | Rickenbach | B60R 21/231 |
| 9,290,148 B2 * | 3/2016 | Hotta | B60R 21/2171 |
| 2006/0108777 A1 | 5/2006 | Mabuchi et al. | |

FOREIGN PATENT DOCUMENTS

| | | |
|---|---|---|
| JP | 2012-131363 | 7/2012 |
| JP | 2013-82297 | 5/2013 |

* cited by examiner

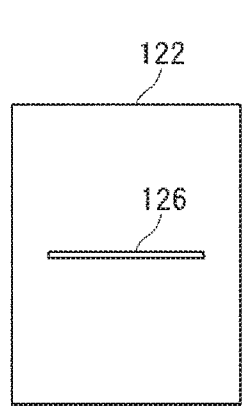 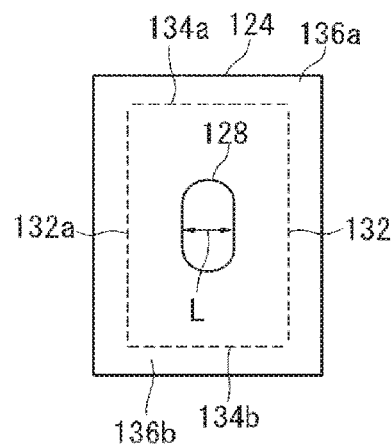 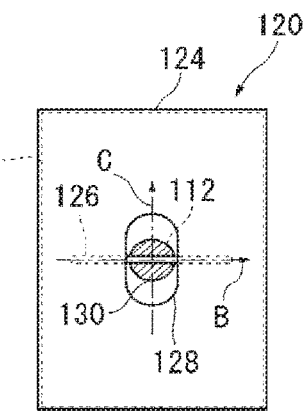
FIG. 4(a)  FIG. 4(b)
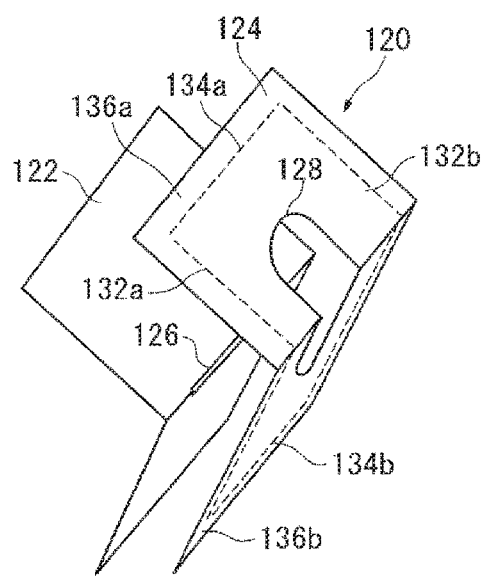 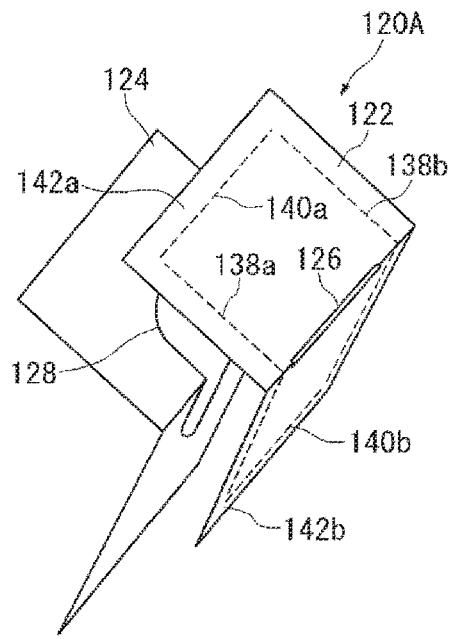
FIG. 4(c)  FIG. 4(d)

AIRBAG DEVICE

CROSS REFERENCE TO RELATED APPLICATIONS

This application claims priority to Japanese Patent Application No. 2014-140993, filed on Jul. 9, 2014 and PCT/JP2015/061442, filed on Apr. 14, 2015.

FIELD OF THE INVENTION

The present invention relates to an airbag device which is installed in a vehicle and which inflates and deploys in order to protect an occupant during an emergency.

An airbag device is a safety device which operates during an emergency such as a vehicle collision and which includes, for example, an inflatable bag-shaped cushion. The cushion inflates and deploys due to gas supplied by an inflator during the emergency to receive and protect an occupant. Airbag devices come in various types in accordance with installation locations or applications. Known examples include a side airbag which inflates and deploys to an immediate side of an occupant from a side part of a vehicle seat in order to protect the occupant from a side collision or from a subsequently occurring rollover (overturn).

A cushion of an airbag device is configured to inflate and deploy mainly under gas pressure, and a gas generation apparatus called an inflator is provided as a gas supply source. Inflators come in various types in accordance with types of airbags and installation locations thereof. For example, a cylinder-type (cylindrical) inflator is mainly used for a curtain airbag, a side airbag, and the like.

An entire inflator or a part thereof is inserted into an airbag (technically, inserted into a cushion of the airbag). For example, Japanese Patent Application Laid-open No. 2012-131363 describes an airbag device including a side airbag and a cylinder-type inflator. The side airbag (cushion) includes an insertion hole for inserting the inflator and a check valve. The check valve is provided inside the cushion so as to cover the insertion hole and includes a pair of cloth pieces formed in an approximately trapezoidal shape.

With the airbag device described in the above-mentioned reference, when the inflator inserted into the cushion through the insertion hole is operated, upper end sides of the pair of cloth pieces forming the check valve separate from each other due to pressure created by gas and allows gas to be supplied. Subsequently, when gas pressure rises to or exceeds a prescribed value, upper end sides of the pair of cloth pieces of the check valve approach each other and limit the movement of gas.

In Japanese Patent Application Laid-open No. 2012-131363, although a check valve is formed by a pair of cloth pieces, the pair of cloth pieces merely separate from or approach each other due to gas pressure. Therefore, with the technique described in the above-mentioned reference, there is a concern that the check valve may become disfigured due to a change in gas pressure during an operation of the inflator and gas may leak to the outside from the insertion hole which is formed on the cushion and into which the inflator is inserted.

In consideration of the problem described above, an object of the present invention is to provide an airbag device configured such that, when an inflator is operated, gas is less likely to leak outside from an insertion hole which is formed on a cushion and into which the inflator is inserted.

SUMMARY AND INTRODUCTORY DESCRIPTION OF THE INVENTION

In order to solve the problem described above, a representative configuration of an airbag device according to the present invention is an airbag device installed in a vehicle, the airbag device including: a cylinder-type inflator; a bag-shaped cushion which inflates and deploys using gas supplied from the inflator; an insertion hole which is formed on the cushion and through which the inflator is inserted into the cushion; and a covering part which is provided on an inner side of the cushion and which covers the insertion hole, wherein the covering part includes: a first cloth piece which is provided at a position overlapping the insertion hole and on which a first hole that is elongated in one direction is formed; and a second cloth piece which is provided so as to overlap with the first cloth piece and on which a second hole is formed so as to have a longitudinal direction in a direction intersecting a longitudinal direction of the first hole at a position overlapping the insertion hole.

According to the configuration described above, in a state where the first cloth piece and the second cloth piece of the covering part are overlapped with each other, the first hole and the second hole straddle the insertion hole. Therefore, when inserting the cylinder-type inflator into the cushion through the insertion hole of the cushion, the inflator can pass through the first hole and the second hole from the insertion hole. In addition, the first hole and the second hole overlap each other so as to intersect respective longitudinal directions. Therefore, when the inflator having passed the covering part is operated to produce inflation gas, the first cloth piece and the second cloth piece function as a check valve to make it difficult for the gas to leak to the outside of the cushion through the insertion hole.

A transverse dimension of the first hole is preferably smaller than a transverse dimension of the second hole. In this case, for example, the first hole of the first cloth piece may be formed as a slit and the second hole of the second cloth piece may be formed as a slot (for example, an elongated hole). Accordingly, when inserting the cylinder-type inflator into the cushion, the inflator can pass through the slot of the second hole while expanding the slit of the first hole.

The transverse dimension of the second hole is preferably approximately equal to a diameter of the inflator. In this case, when inserting the cylinder-type inflator into the cushion, for example, the slit of the first cloth piece is expanded by a stud bolt of the inflator. The slit of the first cloth piece in the expanded state is pressed by, for example, the slot which is formed on the second cloth piece that covers the first cloth piece and which has a transverse dimension that is approximately equal to a diameter of the inflator. Therefore, the slit of the first cloth piece in the expanded state is restored to its original state by the slot of the second cloth piece. As a result, a gap between the inflator inserted into the cushion and the slit of the first cloth piece decreases and gas leakage during an operation of the inflator can be reduced.

The first cloth piece and the second cloth piece are preferably mountain-folded above the first hole along the longitudinal direction of the first hole so as to protrude toward the inside of the cushion. Accordingly, when inserting the inflator into the covering part, by pushing a tip of the inflator toward an apex created by overlapping and mountain-folding the first cloth piece and the second cloth piece, the tip can pass through the first hole and the second hole more readily. As a result, the inflator can be inserted into the cushion with ease.

The first cloth piece is preferably provided on the inner side of the cushion and positioned between the second cloth piece and the inner side of the cushion. Accordingly, when the inflator is inserted into the cushion, the inflator first passes through, for example, the slit of the first cloth piece which the inflator directly faces. At this point, the slit of the first cloth piece is expanded by a main body of the inflator and by a stud bolt protruding from the main body. Subsequently, the inflator passes through, for example, the slot of the second cloth piece. At this point, the slit of the first cloth piece in the expanded state is restored to its original state by the slot of the second cloth piece. Therefore, a gap between the inflator inserted into the cushion and the slit of the first cloth piece decreases and gas leakage during an operation of the inflator can be reduced.

At least both ends in a longitudinal direction of the first cloth piece are preferably joined to the inner side of the cushion. Accordingly, the covering part can be provided on the inner side of the cushion in a state where the first cloth piece and the second cloth piece are overlapped with each other and straddle the insertion hole.

The second cloth piece is preferably provided on the inner side of the cushion and positioned between the first cloth piece and the inner side of the cushion. Accordingly, when the inflator is inserted into the cushion, the inflator first passes through, for example, the slot of the second cloth piece which the inflator directly faces, and subsequently passes through, for example, the slit of the first cloth piece. At this point, the slit of the first cloth piece is expanded by the main body of the inflator and by the stud bolt protruding from the main body. However, a gap between the inflator inserted into the cushion and the slit of the first cloth piece is covered by the second cloth piece which is overlapped with the first cloth piece. Therefore, the gap decreases and gas leakage during an operation of the inflator can be reduced.

At least both ends in a longitudinal direction of the second cloth piece are preferably joined to the inner side of the cushion. Accordingly, the covering part can be provided on the inner side of the cushion in a state where the first cloth piece and the second cloth piece are overlapped with each other and straddle the insertion hole.

Preferably, by being overlapped with each other so as to cover the insertion hole, the first cloth piece and the second cloth piece form a check valve which restricts leakage of gas to an outside of the cushion after an operation of the inflator. Accordingly, since a check valve is formed by the first cloth piece and the second cloth piece, leakage of gas to the outside of the cushion through the insertion hole can be reduced when the inflator inserted into the cushion operates.

According to the present invention, an airbag device can be provided in which gas is less likely to leak outside from an insertion hole of a cushion when an inflator is operated.

BRIEF DESCRIPTION OF THE DRAWINGS

FIGS. 4(a),(b),(c) and (d) are diagrams illustrating a covering part of the cushion shown in FIG. 1.

7(a) and (b) are diagrams illustrating an airbag device according to a comparative example.

Figure 8A:
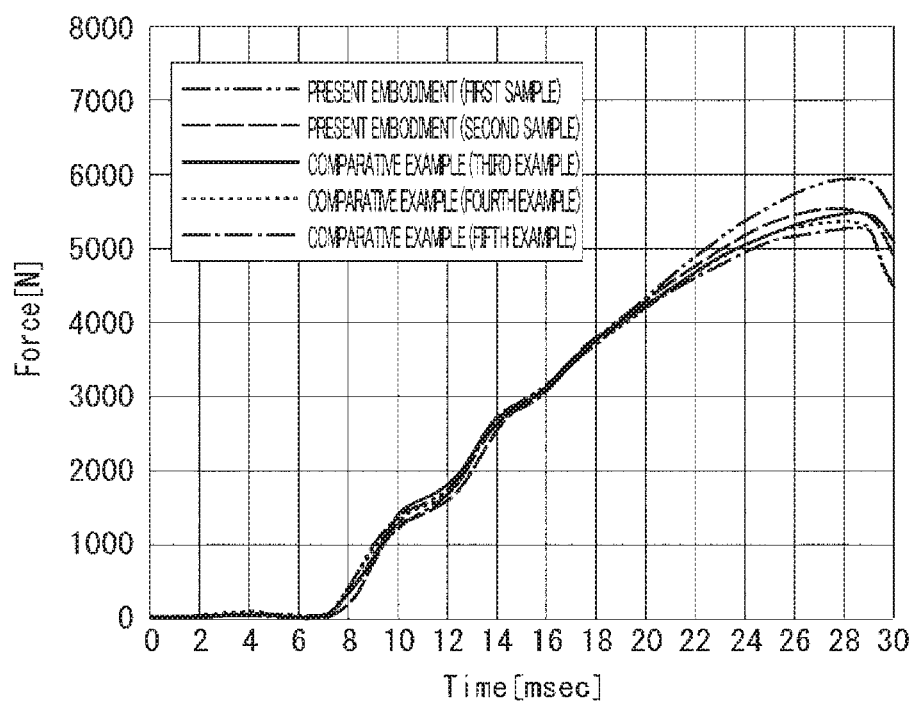

FIGS. 8(a) and (b) are graphs comparing impactor reaction forces of the embodiment and the comparative example according to the present invention.

DETAILED DESCRIPTION

Hereinafter, preferred embodiments of the present invention will be described in detail with reference to the accompanying drawings. Dimensions, materials, specific numerical values, and the like described in the embodiments are simply examples provided for facilitating understanding of the invention and are not intended to limit the invention unless otherwise noted. Moreover, for elements having functions or configurations which are substantially the same in the present specifications and in the drawings, redundant descriptions will be omitted by denoting such elements with same reference signs. In addition, elements not directly related to the present invention will not be illustrated.

Figure 1:
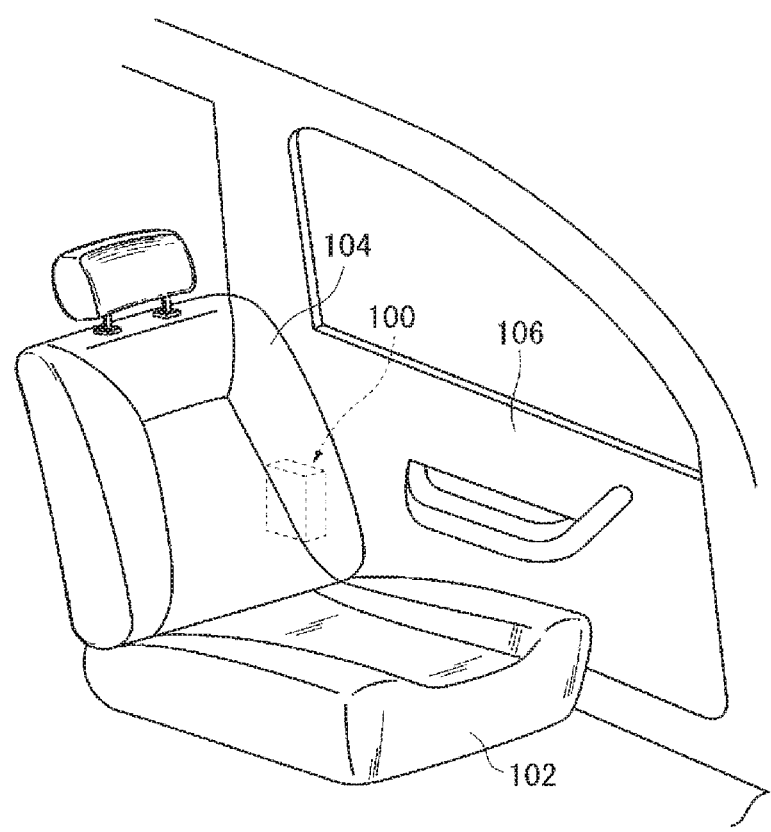
FIG. 1 is a diagram schematically illustrating an airbag device according to an embodiment of the present invention.

FIG. 1 is a diagram schematically illustrating an airbag device according to an embodiment of the present invention. An airbag device 100 is built into, for example, a seat back 104 of a vehicle seat 102. The airbag device 100 is provided on a vehicle outer side of the seat back 104 and includes a cushion 108 (refer to FIG. 2) which is provided upright and inflates and deploys between the vehicle seat 102 and a door 106.

Figure 2A:
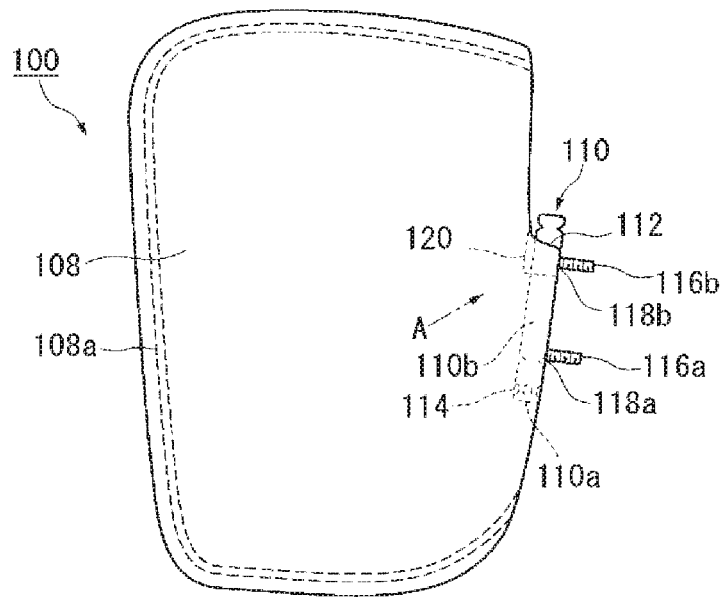
FIGS. 2(a) and (b) are diagrams illustrating, in detail, a part of the airbag device shown in FIG. 1.
Figure 2B:
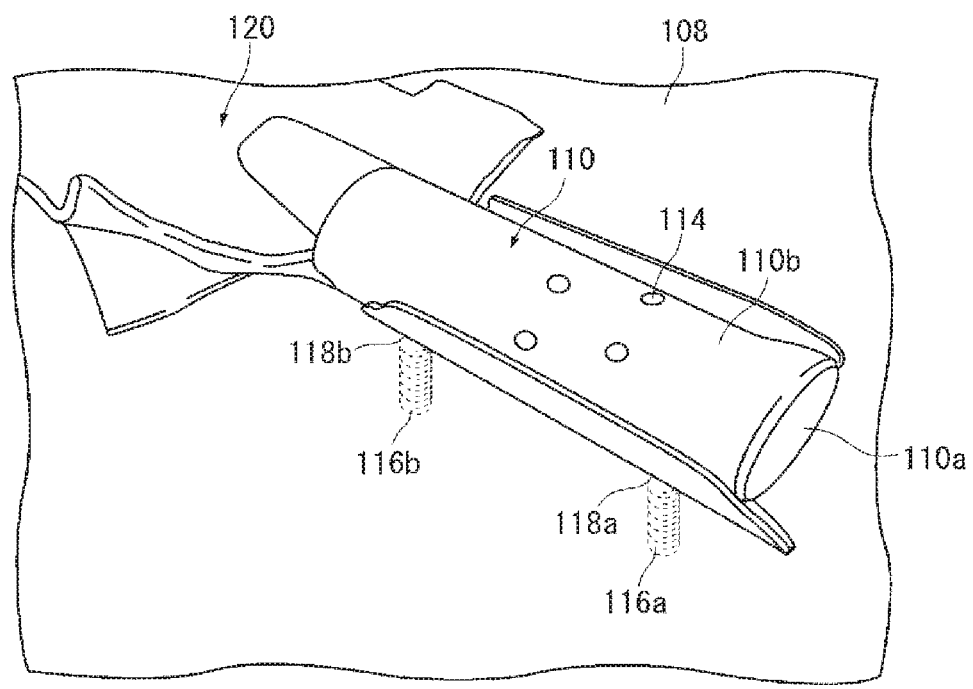

FIGS. 2(a) and (b) are diagrams illustrating, in detail, a part of the airbag device 100 shown in FIG. 1. FIG. 2(a) illustrates a deployed state of the cushion 108. FIG. 2(b) is a view taken in the direction of an arrow A in FIG. 2(a) and shows a state of viewing an inner side of the cushion 108. For example, the cushion 108 is formed in a bag shape by a method of sewing from a total of two sheets of base fabric constituting front and back surfaces or by a method of weaving using OPW (One-Piece Woven).

The cushion 108 according to an embodiment of the invention is constituted by one sheet of cloth and is formed in a bag shape by sewing a periphery thereof along a sewing line 108a. In addition, the airbag device 100 includes an inflator 110. The inflator 110 is a gas generation apparatus and is configured to generate and supply gas as a gas generating agent inside the inflator 110 burns. The inflator 110 is a cylinder-type (cylindrical) inflator and, as shown in FIG. 2(a), a part of the inflator 110 is inserted into the cushion 108 to near a center thereof through an insertion hole 112 formed on the cushion 108 so that the inflator 110 is attached to the cushion 108.

As shown in FIG. 2(b), a gas supply hole 114 is provided on a side of a tip 110a of the inflator 110 inserted to the inner side of the cushion 108. In addition, the inflator 110 is provided with stud bolts 116a and 116b protruding from a main body 110b of the inflator 110. The inflator 110 is fixed to, for example, the vehicle seat 104 (refer to FIG. 1) by passing the stud bolts 116a and 116b through hole parts 118a and 118b formed on the cushion.

Figure 3A:
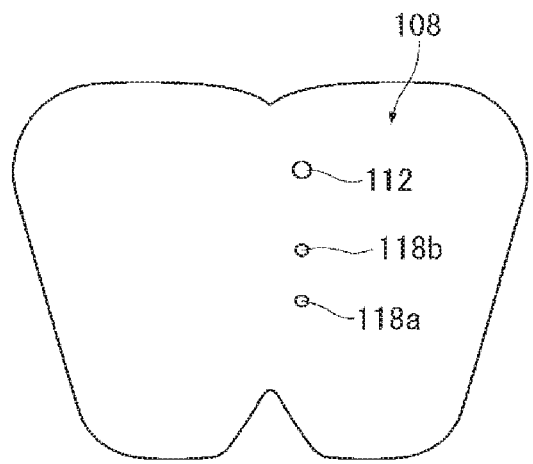
FIGS. 3(a) and (b) are diagrams illustrating the cushion shown in FIG. 1 in a state prior to sewing.
Figure 3B:
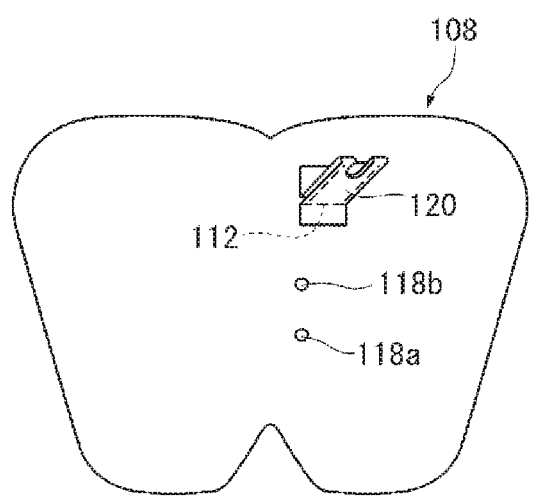

FIGS. 3(a) and (b) are diagrams illustrating the cushion 108 shown in FIG. 1 in a state prior to sewing. As shown in FIG. 3(a), the insertion hole 112 and the hole parts 118a and 118b are formed on the cushion 108. The airbag device 100 includes the covering part 120 as shown in FIG. 3(b). The covering part 120 is provided on the inner side of the cushion 108 and covers the insertion hole 112.

FIGS. 4(a),(b),(c) and (d) are diagrams illustrating the covering part 120 of the cushion 108 shown in FIG. 1. As shown in FIG. 4(a), the covering part 120 includes a first cloth piece 122 and a second cloth piece 124. A longitudinal first hole (a slit 126) is formed on the first cloth piece 122. A longitudinal second hole (a slot 128) is formed on the second cloth piece 124.

FIG. 4(b) shows an area 130 in which the insertion hole 112 is projected on the covering part 120 and schematically illustrates a positional relationship between the first cloth piece 122 and the second cloth piece 124 overlapped with the area 130. The first cloth piece 122 covers the insertion hole 112 and directly faces the inner side of the cushion. The slit 126 of the first cloth piece 122 is provided at a position overlapping the insertion hole 112 and formed elongated in one direction, and straddles the insertion hole 112.

The second cloth piece 124 is provided so as to overlap with the first cloth piece 122 and faces the inner side of the cushion 108 via the first cloth piece 122. In other words, the first cloth piece 122 is positioned between the second cloth piece 124 and the inner side of the cushion 108. The slot 128 of the second cloth piece 124 is formed at a position overlapping the insertion hole 112 to have a longitudinal direction in a direction intersecting a longitudinal direction of the slit 126. In other words, as shown in FIG. 4(b), a longitudinal direction B of the slit 126 and a longitudinal direction C of the slot 128 intersect each other in the area 130. Moreover, while the drawing shows respective longitudinal directions B and C of the slit 126 and the slot 128 intersecting each other at right angles on the area 130, this is not restrictive and the longitudinal directions B and C may intersect each other at angles other than right angles.

In addition, a transverse dimension L shown in FIG. 4(a) of the slot 128 of the second cloth piece 124 is approximately equal to a diameter of the inflator 110. Moreover, a transverse dimension of the slit 126 of the first cloth piece 122 is smaller than the transverse dimension L of the slot 128. Furthermore, the second cloth piece 124 includes sewing lines 132a, 132b, 134a, and 134b shown in FIG. 4(a).

The first cloth piece 122 and the second cloth piece 124 are overlapped with each other as shown in FIG. 4(c), and are first mountain-folded above the slit 126 along the longitudinal direction of the slit 126 so as to protrude toward the inside of the cushion 108 (refer to FIG. 3(b)). The term "mountain-folded" is used here to describe the first and the second cloth pieces each folded partially back onto itself as shown, for example, in FIG. 5(a). Next, the first cloth piece 122 and the second cloth piece 124 are sewn along the sewing lines 132a and 132b in a state of being respectively mountain-folded. Subsequently, for example, both ends 136a and 136b in a longitudinal direction of the slot 128 in the second cloth piece 124 are sewn to the inner side of the cushion 108 at the sewing lines 134a and 134b. In this manner, the covering part 120 is provided on the inner side of the cushion 108 so as to cover the insertion hole 112.

Moreover, while in the covering part 120, the first cloth piece 122 opposes the inner side of the cushion 108 and the second cloth piece 124 overlaps with the first cloth piece 122 and covers the insertion hole 112 in the present embodiment, this is not restrictive. Specifically, as in a case of a covering part 120A illustrated in FIG. 4(d), a positional relationship between the first cloth piece 122 and the second cloth piece 124 may be reversed with respect to that of the covering part 120. In the covering part 120A, the second cloth piece 124 opposes the inner side of the cushion 108 and the first cloth piece 122 overlaps with the second cloth piece 124 and covers the insertion hole 112. In other words, the second cloth piece 124 is positioned between the first cloth piece 122 and the inner side of the cushion 108.

In the case of the covering part 120A illustrated in FIG. 4(d), first, the second cloth piece 124 covers the insertion hole 112, and the first cloth piece 122 and the second cloth piece 124 are respectively mountain-folded so that the first cloth piece 122 overlaps with the second cloth piece 124 and are sewn at sewing lines 138a and 138b. Subsequently, both ends 142a and 142b in a longitudinal direction of the slit 126 in the first cloth piece 122 are sewn to the inner side of the cushion 108 at sewing lines 140a and 140b. In this manner, the covering part 120A may be provided on the inner side of the cushion 108 so as to cover the insertion hole 112.

Figure 5A:
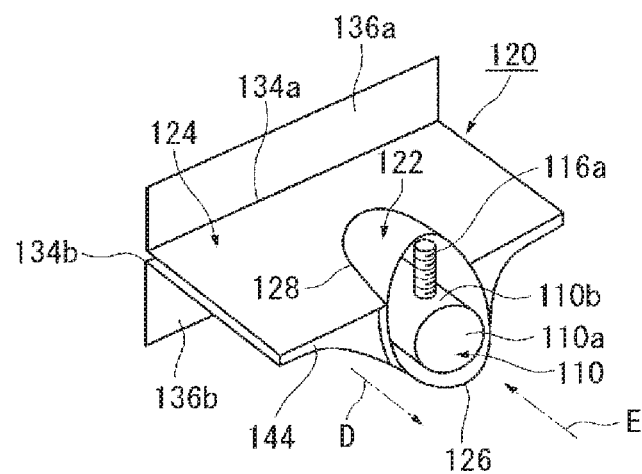
FIGS. 5(a) and (b) are diagrams illustrating a procedure of inserting an inflator into the covering part shown in FIGS. 4(a-d).
Figure 5B:
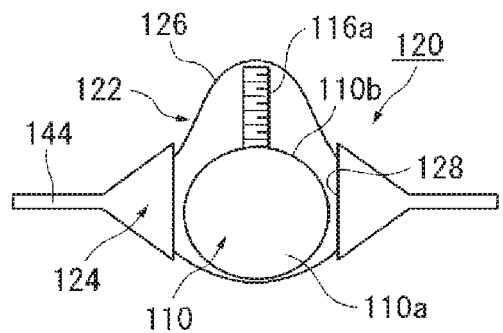

Hereinafter, an operation in the airbag device 100 by which the inflator 110 is inserted into the cushion 108 through the insertion hole 112 and the covering part 120 will be described. FIGS. 5(a) and (b) are diagrams illustrating a procedure of inserting the inflator 110 into the covering part 120 shown in FIG. 4. FIG. 5(a) shows a state where the tip 110a and the stud bolt 116a of the inflator 110 passes through the slit 126. In FIG. 5(a), an insertion direction of the inflator 110 is indicated by an arrow D. FIG. 5(b) is a view taken in the direction of an arrow E in FIG. 5(a).

The inflator 110 is first inserted into the insertion hole 112, and subsequently passes through the slit 126 of the first cloth piece 122 which covers the insertion hole 112 and which directly faces the cushion 108. The slit 126 of the first cloth piece 122 is overlapped with the second cloth piece 124 having the slot 128 with a transverse dimension L (refer to FIG. 4(a)) which is approximately equal to a diameter of the inflator 110. Therefore, as shown in FIGS. 5(a) and 5(b), the slit 126 becomes deformable with the passage of the main body 110b and the stud bolt 116a protruding from the main body 110b of the inflator 110. Consequently, as illustrated, the slit 126 of the first cloth piece 122 is expanded by the main body 110b and the stud bolt 116a and is capable of having the stud bolt 116a pass through readily.

At this point, when inserting the inflator 110 into the covering part 120, the tip 110a of the inflator 110 is preferably pushed in toward an apex 144 created by overlapping and mountain-folding the first cloth piece 122 and the second cloth piece 124. Accordingly, the tip 110a of the inflator 110 can pass through the slit 126 and the slot 128 more readily and the inflator 110 can be readily inserted into the cushion 108.

Figure 6A:
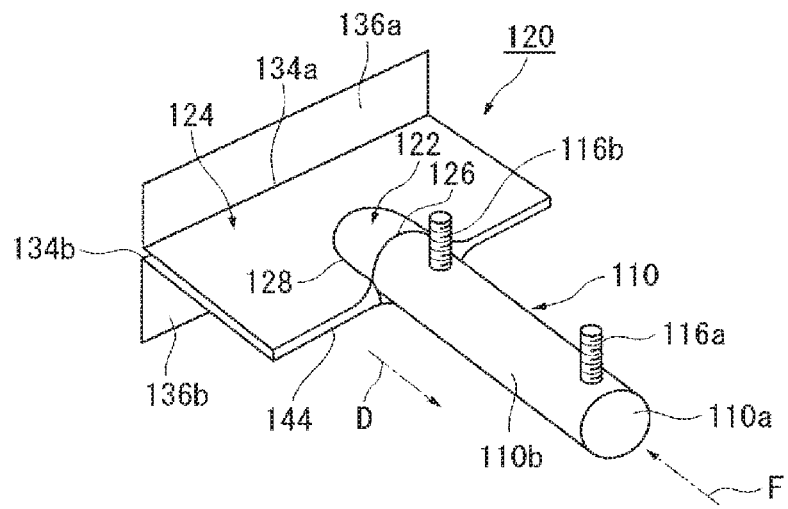
FIGS. 6(a),(b) and (c) are diagrams illustrating a procedure of inserting an inflator which is a continuation of FIGS. 5(a) and (b).
Figure 6B:
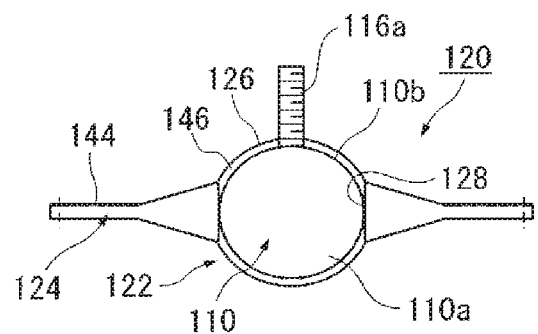

FIGS. 6(a), (b) and (c) are diagrams illustrating the procedure of inserting the inflator 110 which is a continuation of FIGS. 5(a) and (b). FIG. 6(a) shows a state where, continuing from FIG. 5(a), the stud bolt 116b of the inflator 110 has passed through the slit 126. FIG. 6(b) is a view taken in the direction of an arrow F in FIG. 6(a).

Continuing from FIG. 5(a), when the stud bolts 116a and 116b of the inflator 110 pass through the slit 126 of the first cloth piece 122, the slit 126 is pressed by the slot 128 of the second cloth piece 124 as shown in FIGS. 6(a) and 6(b). Therefore, the slit 126 of the first cloth piece 122 in the expanded state shown in FIGS. 5(a) and 5(b) is restored to its original state by the slot 128 of the second cloth piece 124. As a result, as shown in FIG. 6(b), a gap 146 between the inflator 110 and the slit 126 of the first cloth piece 122 decreases and gas leakage during an operation of the inflator 110 can be reduced.

Moreover, a case will be described where, in the airbag device 100, the inflator 110 is inserted into the cushion 108 through the insertion hole 112 and the covering part 120A illustrated in FIG. 4(b). In this case, the inflator 110 first passes through the slot 128 of the second cloth piece 124 which the inflator 110 directly faces, and subsequently passes through the slit 126 of the first cloth piece 122. At this point, the slit 126 of the first cloth piece 122 is expanded by the main body 110b and the stud bolts 116a and 116b of the inflator 110. However, a gap between the inflator 110 inserted into the cushion 108 and the slit 126 of the first cloth piece 122 is covered by the second cloth piece 124 which is overlapped with the first cloth piece 122. Therefore, even when the covering part 120A is provided on the inner side of the cushion 108, the gap decreases and gas leakage during an operation of the inflator 110 can be reduced.

Figure 6C:
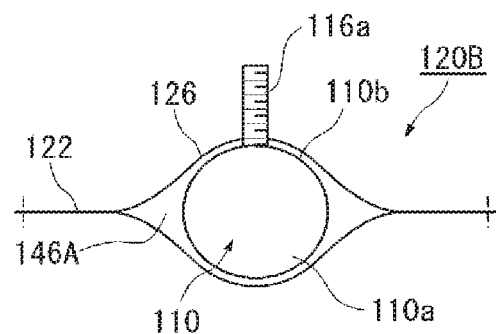

In contrast, as shown in FIG. 6(c), with a covering part 120B as a comparative example which is formed solely by the first cloth piece 122, the slit 126 of the first cloth piece 122 is not pressed by the slot 128 of the second cloth piece 124. As a result, with the covering part 120B, a gap 146A between the inflator 110 and the slit 126 of the first cloth piece 122 increases and gas leakage inevitably occurs during an operation of the inflator 110.

Figure 7A:
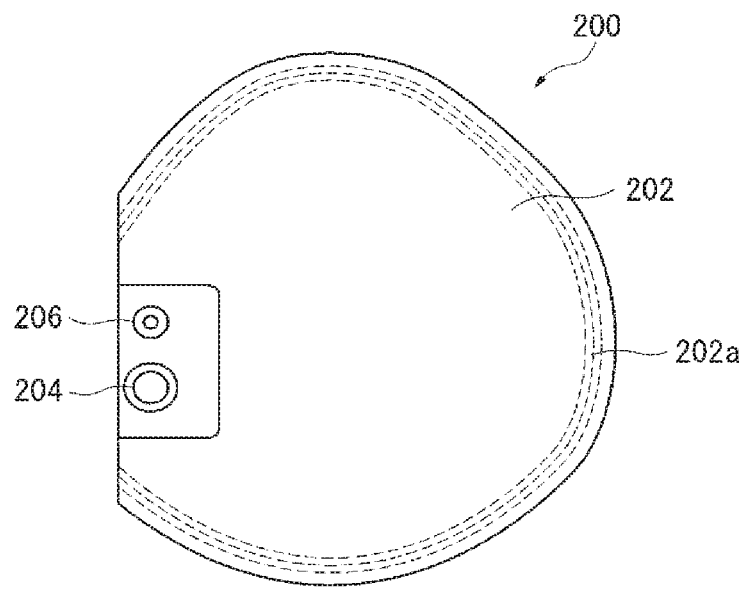
Figure 7B:
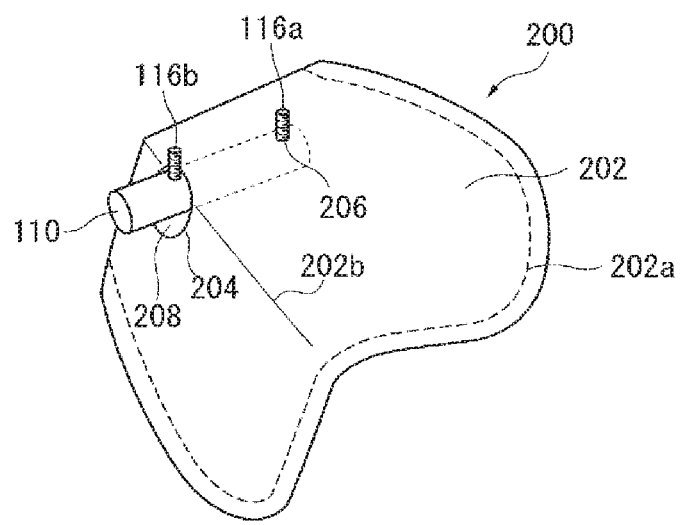

FIGS. 7(a) and (b) are diagrams illustrating an airbag device 200 according to a comparative example. FIG. 7(a) is a diagram showing a cushion 202 of the airbag device 200. FIG. 7(b) is a diagram showing a state where the inflator 110 is inserted into the cushion 202.

The airbag device 200 differs from the airbag device 100 according to the present embodiment in that the covering part 120 is not formed on the cushion 202. As shown in FIG. 7(a), an insertion hole 204 for the inflator 110 and a hole part 206 through which the stud bolt 116a is to be passed are formed on the cushion 202. Moreover, another hole part through which the stud bolt 116b is to be passed may be added to the cushion 202 and, after inserting the inflator 110 to the inside through the insertion hole 204, the stud bolts 116a and 116b may be passed through the hole parts.

In the airbag device 200 according to the comparative example, when the inflator 110 operates, the cushion 202 swings in an initial stage of deployment and folds as indicated by a polygonal line 202b in FIG. 7(b). Subsequently, as the cushion 202 deploys, the cushion 202 exhibits a behavior of folding while elongating. Due to such a behavior and, particularly, due to the swinging and elongation of the cushion 202, a large gap 208 such as shown in FIG. 7(b) is created between the inflator 110 and the insertion hole 204 and a gas leakage is likely to occur.

Figure 8B:
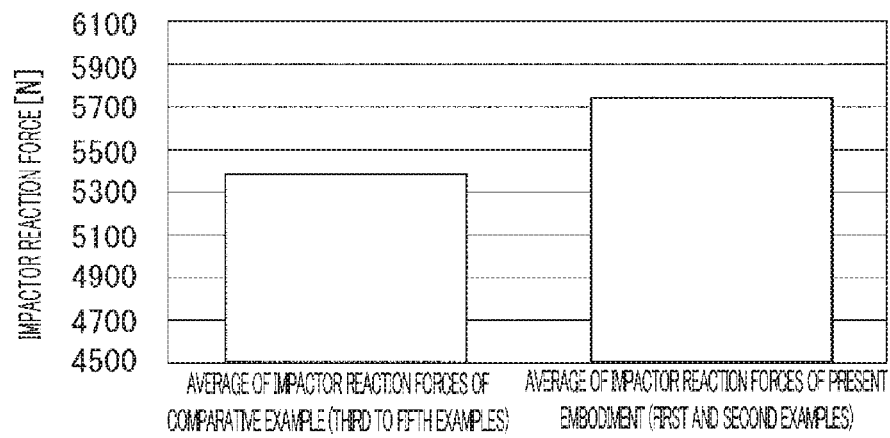

FIGS. 8(a) and (b) are graphs comparing impactor reaction forces of the embodiment and the comparative example according to the present invention. In FIG. 8(a), a horizontal axis represents time and a vertical axis represents an impactor reaction force. FIG. 8(b) shows an average of impactor reaction forces according to the embodiment and an average of impactor reaction forces according to the comparative example of the present invention shown in FIG. 8(a). Moreover, an airbag device in which the covering part 120 is not formed such as the airbag device 200 illustrated in FIG. 7 is used as the comparative example.

In this case, instead of directly measuring gas leakage from the insertion hole 112 of the inflator 110, an impactor reaction force when causing an impactor to collide with the cushion 108 is measured. As the impactor reaction force, an impactor reaction force prior to the impactor causing so-called bottoming in which the impactor comes into contact with a wall surface or the like via the cushion 108 is adopted. Moreover, since it is assumed that pressure inside the cushion 108 drops when gas leakage is significant, gas leakage can be indirectly compared using impactor reaction forces.

FIG. 8(a) illustrates graphs of a first sample and a second sample which represent the embodiment of the present invention and graphs of a third sample, a fourth sample, and a fifth sample which represent the comparative example. From a comparison of these graphs, as illustrated in FIG. 8(a), it is clear that the impactor reaction force of the embodiment of the present invention is larger than those of the comparative examples. This is because, by being overlapped with each other so as to cover the insertion hole 112, the first cloth piece 122 and the second cloth piece 124 forming the covering part 120 form a check valve which restricts leakage of gas to the outside of the cushion 108 after an operation of the inflator 110.

In addition, with the airbag device 100, the gap 146 with the inflator 110 is reduced by the first cloth piece 122 and the second cloth piece 124 instead of the insertion hole 112. Therefore, with the airbag device 100, even if the gap 208 (refer to FIG. 7(b)) is created in the insertion hole 112 due to swinging and elongation during deployment of the cushion 108, gas leakage can be reduced by the covering part 120 which functions as a check valve.

As a result, as shown in FIG. 8(b), it is confirmed that an average of impactor reaction forces according to the present invention represents an improvement of approximately 400 N over an average of impactor reaction forces according to the comparative example.

As described above, in the present embodiment, the slit 126 and the slot 128 straddle the insertion hole 112 in a state where the first cloth piece 122 and the second cloth piece 124 of the covering part 120 overlap with each other. Therefore, when inserting the inflator 110 into the cushion 108 through the insertion hole 112, the inflator 110 can pass through the slit 126 and the slot 128 from the insertion hole 110. In addition, the slit 126 and the slot 128 overlap with each other so as to intersect respective longitudinal directions. Therefore, when the inflator 110 having passed the covering part 120 is operated, the first cloth piece 122 and the second cloth piece 124 function as a check valve to make it difficult for gas to leak to the outside of the cushion 108 through the insertion hole 110.

While a side airbag is described as an example of an airbag device in the embodiment described above, an airbag device is not limited to a side airbag and may instead be a curtain airbag which inflates and deploys along a side window from a vicinity of a ceiling of a wall part in order to protect an occupant from a side collision or from a subsequently occurring rollover (overturn). Moreover, when the airbag device is a curtain airbag, a hole may be formed in a duct portion into which gas is introduced and an inflator may be inserted into the hole.

Although a preferred embodiment of the present invention has been described above with reference to the accompanying drawings, it is needless to say that the present invention is not limited to the example. It will be obvious to those skilled in the art that various modifications or corrections may be made without departing from the scope of the claims, and it is to be understood that such modifications and corrections will naturally fall within the technical scope of the present invention.

In addition, while an example in which the airbag device according to the present invention is applied to an automobile has been described in the embodiment presented above, the airbag device according to the present invention can also be applied to an aircraft or a ship to produce similar working effects.

While the above description constitutes the preferred embodiment of the present invention, it will be appreciated that the invention is susceptible to modification, variation and change without departing from the proper scope and fair meaning of the accompanying claims.

The invention claimed is:

1. An airbag device adapted to be installed in a vehicle, the airbag device comprising:
   a cylindrical inflator;
   a bag-shaped cushion which inflates and deploys by a gas supplied from the inflator;
   an insertion hole which is formed by the cushion and through which the inflator is inserted into the cushion to assemble the airbag;
   a covering part which is provided on an inner side of the cushion and which covers the insertion hole, wherein the covering part includes:
   a first cloth piece provided at a position overlapping the insertion hole and on which a first hole that is elongated in one direction is formed; and
   a second cloth piece which is provided so as to overlap with the first cloth and on which a second hole is formed so as to have a longitudinal direction of the second hole crossing and intersecting a longitudinal direction of the first hole at a position overlapping the insertion hole, the first and the second cloth pieces are folded to at least partially overlap so as to protrude toward the inside of the cushion.

2. The airbag device according to claim 1, further comprising wherein a transverse dimension of the first hole is smaller than a transverse dimension of the second hole.

3. The airbag device according to claim 2, further comprising wherein the transverse dimension of the second hole is approximately equal to a diameter of the inflator.

4. The airbag device according to claim 1 further comprising, wherein the first cloth piece and the second cloth piece are folded in a mountain-folded manner above the insertion hole along the longitudinal direction of the first hole.

5. The airbag device according to claim 1 further comprising wherein the first cloth piece is provided on the inner side of the cushion and positioned between the second cloth piece and the inner side of the cushion.

6. The airbag device according to claim 5, further comprising wherein at least two ends in the longitudinal direction of the first cloth are joined to the inner side of the cushion.

7. The airbag device according to claim 1 further comprising, wherein the second cloth is provided on the inner side of the cushion and positioned between the first cloth piece and the inner side of the cushion.

8. The airbag device according to claim 7, further comprising wherein at least ends in the longitudinal direction of the second cloth piece are joined to the inner side of the cushion.

9. The airbag device according to claim 1 further comprising, wherein the first and the second cloth pieces overlap each other so as to cover the insertion hole, the first cloth and the second cloth pieces forming a check valve which restricts leakage of the gas to an outside of the cushion after an operation of the inflator.

10. The airbag device according to claim 1 further comprising, wherein the first hole is a slit.

11. The airbag device according to claim 1 further comprising, wherein the second hole is an elongated hole.

* * * * *